(12) United States Patent
Kwiatkowski

(10) Patent No.: US 11,820,639 B1
(45) Date of Patent: Nov. 21, 2023

(54) LEVEL DISPLAY SYSTEM FOR USE WITH BEVERAGE DISPENSERS AND METHOD OF MAKING SAME

(71) Applicant: Food Equipment Technologies Inc., Lake Zurich, IL (US)

(72) Inventor: Marek K. Kwiatkowski, Round Lake, IL (US)

(73) Assignee: FOOD EQUIPMENT TECHNOLOGIES COMPANY, INC., Lake Zurich, IL (US)

( * ) Notice: Subject to any disclaimer, the term of this patent is extended or adjusted under 35 U.S.C. 154(b) by 80 days.

(21) Appl. No.: 16/873,500

(22) Filed: Apr. 22, 2020

(51) Int. Cl.
 *B67D 1/08* (2006.01)
 *F16B 11/00* (2006.01)
 *A47J 31/44* (2006.01)
 *B67D 1/00* (2006.01)

(52) U.S. Cl.
 CPC ........ *B67D 1/0871* (2013.01); *A47J 31/4457* (2013.01); *B67D 1/0888* (2013.01); *F16B 11/006* (2013.01); *A47J 2203/00* (2013.01); *B67D 2001/0095* (2013.01); *B67D 2210/00031* (2013.01)

(58) Field of Classification Search
 CPC ................ B67D 1/0871; B67D 1/0888; B67D 2001/0095; B67D 2210/00031; A47J 31/4457; F16B 11/006
 See application file for complete search history.

(56) References Cited

U.S. PATENT DOCUMENTS

| | | | | |
|---|---|---|---|---|
| 5,370,840 A | * | 12/1994 | Caron | C22C 9/00 420/492 |
| 5,780,172 A | * | 7/1998 | Fister | B32B 15/01 428/647 |
| 6,741,180 B2 | * | 5/2004 | Lassota | A47J 31/50 340/618 |
| 7,980,422 B2 | * | 7/2011 | Lassota | B67D 1/0871 222/23 |
| 8,387,455 B1 | * | 3/2013 | Kaminski | G01F 23/265 73/304 C |
| 9,121,744 B1 | * | 9/2015 | Kwiatkowski | G01F 23/265 |
| 2016/0368754 A1 | * | 12/2016 | Rosenlund | B67D 1/0081 |

* cited by examiner

*Primary Examiner* — Timothy P. Kelly
(74) *Attorney, Agent, or Firm* — James W. Potthast; POTTHAST & ASSOCIATES

(57) ABSTRACT

A robust hot beverage level display system and method for use in a hot beverage dispenser (12) having a sensing element (105), a level display (28), a controller (50) and an elongate probe carrying at least one elongate electrically conductive trace (202) made from annealed rolled copper with a macrocrystalline structure with elongate, metal, granule-like, cohered metal elements that are aligned with each other in parallel relationship (FIGS. 25 and 28), and an electronics module housing (108), for protectively surrounding the controller (50), formed from a pair of housing sections (109, 110) with a pair of mating connective surfaces (220, 224), potting material with adhesive properties (226) filling the housing (108) and protectively enveloping the controller (218, FIG. 39) and display (217, FIG. 3), and a gapless, voidless adhesive layer made of a contiguous, comingling of cured adhesive and cured potting material interposed between the mating surfaces (220,224).

39 Claims, 14 Drawing Sheets

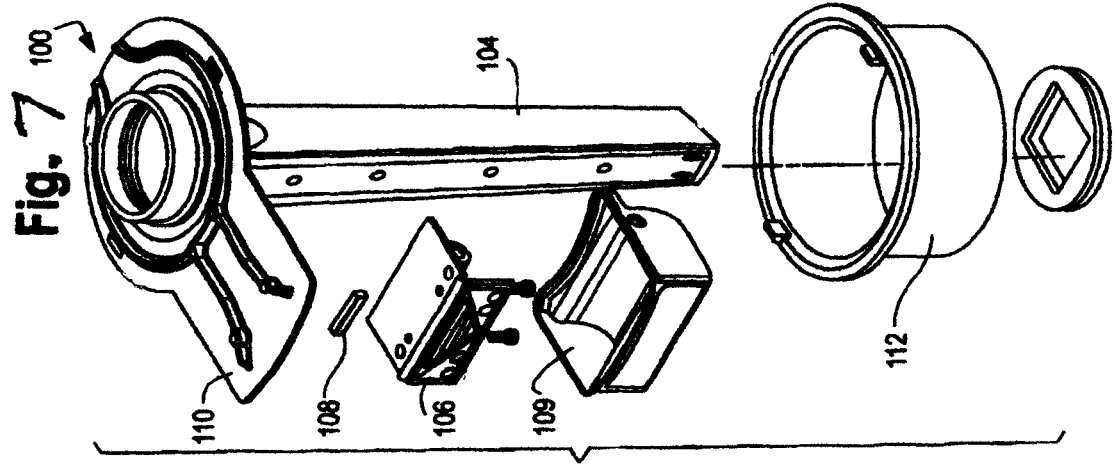
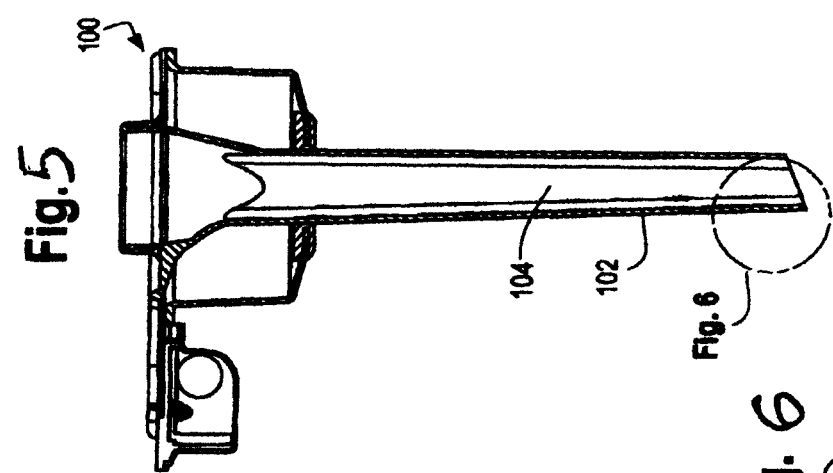
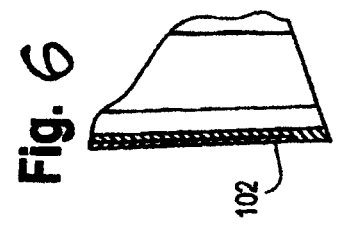
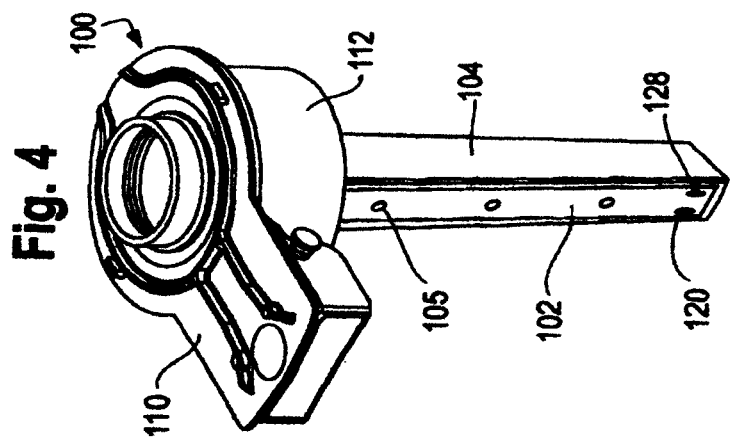

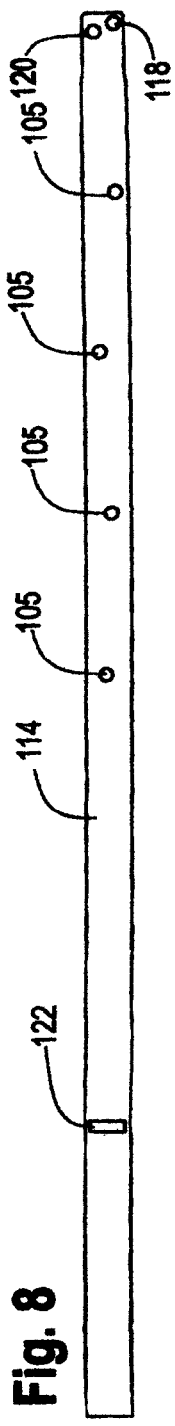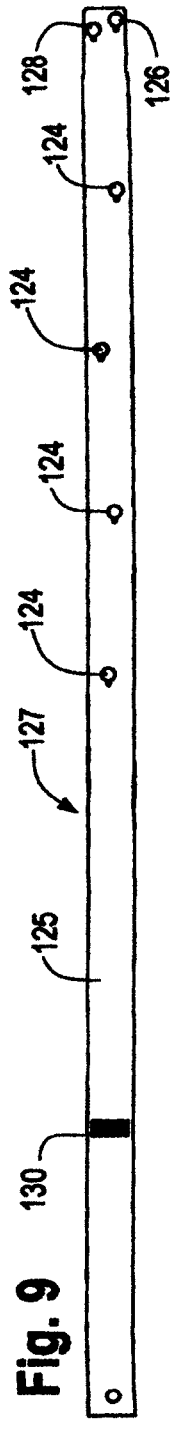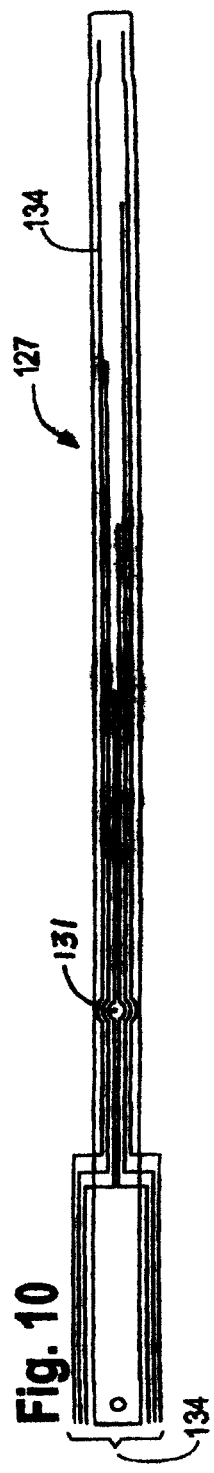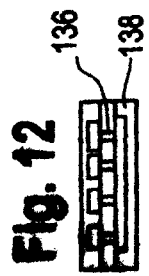

LEVEL DISPLAY SYSTEM FOR USE WITH BEVERAGE DISPENSERS AND METHOD OF MAKING SAME

BACKGROUND OF THE INVENTION

Field of the Invention

This invention generally relates to beverage dispensers with electronic beverage level display systems and, more particularly, to level display systems used in such hot beverage dispensers that are subject to possible damage due to extremes of temperature, caustic chemicals and rough handling during use and manufacturing processes.

Discussion of the Prior Art

Commercial beverage dispensers of the type having a hollow, insulated body made of stainless steel or other opaque materials with a closable top for direct receipt of beverage from a beverage brewer are well known for use in the high service-volume commercial coffee houses, banquet halls, large catered event and the like. Such dispensers have a bottom supported above a support surface with a faucet adjacent the bottom for serving beverage from the hollow body into individual serving cups or the like.

Because the hollow body is made of opaque materials, the quantity, or level, of the beverage cannot be ascertained simply by viewing the outside of the dispenser, as is possible with transparent glass carafes and the like. Such dispensers are provided with electronic level displays as are shown and described in U.S. Pat. No. 6,741,180 issued May 25, 2004 to Zbigniew G. Lassota for an invention in "Beverage Dispensing Urn with Electronic Display", which is hereby incorporated by reference. In the resistive probe used in the dispenser of this patent, the resistance between electrically conductive lands on the exterior of a probe body and exposed to the beverage varies depending upon the level of the beverage being measured to determine the quantity of beverage.

In another patent of Zbigniew G. Lassota, U.S. Pat. No. 7,798,373, issued Sep. 21, 2010 for an invention in an "Airpot Beverage Dispenser with Flow Thorough Lid and Display and Method", and U.S. Pat. No. 9,121,744 issued Sep. 1, 2015 to Marek K. Kwiatkowski et al. for an invention in "Hot Beverage Dispenser with Level Sensing Probe and Method of Making Same", both of which are hereby incorporated by reference, a capacitive level sensing probe is employed in which a change in the capacitance of a circuit corresponds to different beverage levels. This capacitive probe is formed by a series of capacitors at different levels that have a total capacitance that depends upon how many of the capacitors are below or above the surface of the beverage. Unlike the resistive probe, the capacitive plates do not have direct contact with the beverage but instead sense the beverage indirectly due to changes in dielectric constant.

These electronic beverage level display systems have three main components: (1) a sensor array with capacitive or resistive sensor elements mounted to, and arrayed at spaced locations along, an elongate, downwardly extending, relatively rigid probe body, (2)elongate, conductive traces respectively connected to the sensing elements and extending along the length of the probe body detect liquid at different corresponding levels of beverage inside the liquid container, and (3) an electronics module having a portable power supply, a controller and an electronic display protectively located within an electronics housing. The controller is responsive to signals carried by the conductive traces to determine beverage level, or depth, and then controls the electronic display to show the beverage level.

When these known beverage level display systems function, they function well. Unfortunately, they have a relatively high level of failure both during the manufacturing process and after the dispensers are put into regular commercial use. These failures are believed to be due to several causes acting individually or in concert. The electronics circuits, components and traces are fragile and vulnerable to breakage due to rough handling and corrosive cleaning materials, environmental damage from moisture, highly acidic beverages, high heat and large fluctuations in temperature. For instance, during routine use the sensor is immersed in boiling liquid and is also splashed with more boiling liquid that can damage the electronic circuit from excessive moisture and heat.

The elongate sensor probe with attached sensing elements and traces, extends downwardly into the hollow body of the dispenser. When hot coffee is loaded into the hollow bod of the container, air within the enclosure of the elongate sensor probe evacuates the hollow body which creates a relative vacuum. Later, when the sensor enclosure cools, with the cooling of the hot coffee, tea, water or other hot beverage during normal use cycles, the relative vacuum creates a pressure differential that creates a suction force that tends to draw in, damaging, destructive moisture and liquid into the electronics housing. This damaging, moisture-suctioning vacuum is also created when the entire sensor, while at a relatively high temperature, is removed for cleaning and immersed in water at a much cooler temperature. The vacuum created from rapid cooling also tends to draw moisture into the electronics housing. Some of the damage to traces noted above, including even macroscopic shorts between parallel traces and open breaks in the traces that result in complete failure, in addition to microscopic damage resulting in erratic failure, are not always discovered until the dispenser is put to use at a customer's location. In addition to the above causes of damage, the traces formed according to known practice are vulnerable during the injection molding process that is used during assembly.

There have been past attempts to improve the robustness of level sensing probes, but they have only met with partial success.

Use of a semipermeable membrane surrounding the sensor probe, such as GORE Pre-Vent RTM Univent Membrane Vent, referenced in the U.S. Pat. No. 7,798,373 noted above, is known, to somewhat alleviate, but does not solve the problem of moisture ingress.

It is also known to reduce moisture degradation by the use of a potting process pursuant to which, the display electronics housing are "potted", i.e. encapsulated in potting compound, such as Dow Sylgard 575. Pursuant to this process, the entire empty space of the electronics housing is filled with a potting compound that eliminates air, clampens shock and vibrational forces and reduces the ingress of moisture and corrosive agents. The vacuum formed by heat expanding and cooling is reduced, but some moisture and liquid ingress still occur.

The electronics housing is made from two housing sections that have mating connective surfaces that that, after the electronics are mounted, are fastened together. The current industry standard is to seal the two housing sections together by ultra-sonic welding

SUMMARY OF THE INVENTION

It is therefore an object of the present invention to provide improvements to the method, of making, and the structure of beverage display systems of the type noted above that will reduce the incidence rate of failure due to moisture ingress, and breaking or cracking of the electronic sensor connection traces during use or manufacturing.

The object of the invention is achieved in part by replacing the known traces currently used, such as shown and described in the aforementioned U.S. Pat. No. 9,121,744, with traces made from a material with improved compressive and tearing strength characteristics and are therefore less susceptible to damage from the various causes noted above.

Specifically, in accordance with one aspect of the invention, the fragile traces that are formed by a chemical, electrodeposition (ED) process, in which copper is deposited, ion by ion, on a flexible, insulating flexible polyetherimide trace sensor support member are replaced by traces made of annealed rolled copper with greater mechanical strength but with the same or superior conductive characteristics of the ED copper traces currently being used.

Another object of the invention is achieved by eliminating ultra-sonic welding to fasten together the two sections of the electronics housing with a new method that achieves the same or better sealing characteristics. Unfortunately, while the ultrasonic welding method used to seal closed the display electronics housing does help with moisture, there are still trace failures. The inventor has determined that ultrasonic vibrations imparted to the traces from this ultrasonic welding of the housing sections contributes to possible mechanical failure of the traces thereby causing premature circuit failure. It is believed that the vibrational energy may also damage or weaken other electronic components within the housing electronic parts.

Thus, it is an object of the invention to provide a new way to produce stronger traces that are less susceptible to damage and a better ways of fastening and sealing together the two housing sections of the electronics housing that provides as good or better of seal against circuit damage due to moisture and the like as provided by ultra-sonic welding but which avoids the damage that can be caused by use of the ultrasonic welding technique.

It is therefore an object of the present invention to provide an improved beverage level display system that that is more robust than known systems and ameliorates the unreliability and premature failure problems noted above with respect to known beverage display systems and methods of making same.

One particular objective of the invention is to provide in a hot beverage level display system for use with and in combination with a hot beverage dispenser and having at least one level sensing element, an electrical display for showing an indication of the level of beverage within the hollow body, an electronic circuit mounted within a electronics module housing that is responsive to signals from the at least one level sensing element for controlling the electronic display to show the level and an elongate relatively rigid probe body carrying at least one elongate electrically conductive trace interconnecting the at least one level sensing element with the electronic circuit, with an improvement being, a quantity of cured potting material with adhesive properties substantially filling the electronics module housing and protectively enveloping the electronic circuit, a pair of housing sections respectively with a pair of mating surfaces, a composite adhesive layer interposed between the mating surfaces to permanently affix together the pair of housing sections, said adhesive layer being a combination of both an adhesive and some of the potting material filling the electronics module housing, both the adhesive and some of the adhesive potting material being cured and unblended but comingled in contiguous relationship between the mating surfaces.

Preferably, gaps or voids in the potting material that interposed between mating edges of the two mating mounting sections are completely filled in by the adhesive potting material to enhance sealing against moisture and adhesive securement together of the at least two housing sections.

In the preferred embodiment, further, improving the bond between the two housing sections under extreme varying temperature conditions, adhesive and the potting material have a first and second coefficients of thermal expansion, respectively, which are substantially the same. Alternatively, both the potting material and adhesive are sufficiently soft or pliable such that the need for matching coefficients of expansion is reduced. Further, the housing has a third coefficient of thermal expansion that is substantially the same as the first and second coefficients of thermal expansion. This expansion matching substantially reduces the stresses and strains that tend to separate the housing sections.

Further increase in robustness of the hot beverage level display system is achieved by replacing ordinary electrodeposited copper traces used to connect the sensor element with the electronic controller with much stronger traces made from metallic film having macrocrystalline structure with elongate, metal, granule-like, cohered metal elements that are aligned with each other in generally parallel relationship. Preferably, the elongate, metal, granule-like, macroscopic metal elements are aligned with the elongate direction of the elongate trace, and the elongate trace is made from rolled annealed copper film.

The object of the invention is also achieved in part by provision in a hot beverage level display system for use with and in combination with a hot beverage dispenser and having at least one level sensing element, an electrical display for showing an indication of beverage the level of beverage within the hollow body, an electronic circuit responsive to signals from the at least one level sensing element for controlling the electronic display to show the level, with an improvement having an elongate relatively rigid probe body carrying at least one elongate electrically conductive trace interconnecting the at least one level sensing element with the electronic circuit, said conductive trace formed from rolled metal film having a macrocrystalline structure with elongate, metal, granule-like, cohered metal elements that are aligned with each other in generally parallel relationship, a housing surrounding the electronic circuit formed of at least two housing sections with mating surfaces that are attached to each other in mating relationship by a food-safe adhesive that is substantially impervious to hot beverage moisture and hot beverage heat that is interposed in tight bonding relationship between the mating surfaces, said housing sections having first and second coefficients of thermal expansion, respectively, that are substantially or exactly the same and said adhesive having a third coefficient of thermal expansion that is substantially the same as the first and second coefficients of thermal expansion.

Preferably, the potting material has adhesive properties, and some of the potting material is interposed between the mating surfaces together with the adhesive and filling voids in the adhesive interposed between the mating surfaces to improve the strength of the bonding and sealing together of the mating surfaces beyond that achievable with only the adhesive.

Achievement of the object is also achieved by providing in a hot beverage level sensing probe for measuring the level of beverage contained inside an opaque hollow body of a hot beverage dispenser, and having an elongate sensor support member carrying at least one liquid level sensor, an electronics module for processing electrical signals from the at least one level sensor to determine a water level for display, and a display connected with the electronics module for displaying the level determined by the electronics module based upon the electrical signals, with an improved robust electrical link between the sensor and the electronics having an elongate, electrically conductive trace made of a metal processed to have a microscopic, parallel-directed crystalline structure, and means for securing the electrical conductor with directed crystalline structure to the elongate sensor support member and extending along the sensor support member in connected, conductive electrical contact between the at least one liquid level sensor and the electronics module.

Preferably, the sensor support member is a relatively inflexible elongate member that extends in an elongate direction extending between the sensor and the electronic module, and there are layers of polyimide overlying both sides of the rolled metal and means for mounting the polyimide layers to or mounting the polyimide layer to the elongate sensor support member.

The objective is also achieved partly by providing a method of making the hot beverage level sensor described above for use with a hot beverage brewer and having an elongate sensor probe carrying a sensing element and a conductive trace interconnecting the sensing element with an electronic level indicating circuit within a housing by performance of the steps of steps of mounting the circuit to one of at least two housing sections that form the housing when mating surfaces of the housing sections are joined in mating relationship, applying, when in a viscous state a food-safe, adhesive between the mating surfaces of the two mating housing sections, placing the mating surfaces in mutual engagement to form the electronics housing holding the mating edge surfaces together in mutual engagement until the adhesive sets, after the adhesive has set, but before the adhesive has fully cured into a fully dried state, injecting uncured potting material into the electronics housing to protectively enclose the electronics circuit from hot beverage heat and moisture and allowing the adhesive and the potting material to cure together until both are fully cured.

The housing has at least one hole for receipt of injected potting material, and the method includes the step of closing the opening after the potting material has been injected and before the potting material and adhesive have cured. The step of holding is performed with the use of adjustable, removable clamps. The step of holding together is terminated after the adhesive has set.

Importantly, the method includes the step of filling in with potting material any voids or gaps in the adhesive between mating surfaces of the housing sections to strengthen the bond between the mating surface.

BRIEF DESCRIPTION OF THE DRAWINGS

The foregoing objects, features and advantages will be described and other objects, features and advantages will be made apparent from the following detailed description which us given with reference to the several figures of the drawing, in which:

FIG. 4 is a perspective view of one form of the beverage level sensing system funnel assembly of the present invention in which several resistive sensor elements are employed to sense the beverage level;

FIG. 5 is a cross-sectional side view of the beverage level sensing system of FIG. 4;

FIG. 6 is an enlarged view of a portion of the down tube of FIG. 5A illustrating the attachment of a flexible sensor mounting member to the relatively rigid sensor probe, or down tube;

FIG. 7 is an exploded view of the funnel assembly of FIGS. 4-6 illustrating the various parts of the funnel assembly, the electronics housing and rigid sensor support member and down tube;

FIG. 8 is a top view of the front covering layer of Ultem® 1010F of the three-ply flexible sensor mounting member 4-7 illustrating the location of access openings for the beverage and for access to a connector on the top surface of the middle ply;

FIG. 9 is top view of the top surface of the Doosan® flexible PC circuit film 600 series or equivalent middle ply of the three-ply flexible resistive circuit of FIGS. 4-7 illustrating the location of sensing pads, or sensor elements, aligned with the sensing access opening of FIG. 8 and sensor-trace connectors;

FIG. 10 is a view through the front covering layer of the back surface of the Doosan® flexible PC circuit film middle ply of FIG. 9 illustrating the location of the strengthened traces being carried thereby for respective connections with the associated the sensor pad connectors;

FIG. 11 is a view of the back layer of Ultem® 1010F back cover layer;

FIG. 12 is an end view illustrating through hole-connections between the circuit elements on the front surface of the middle Doosan® flexible PC circuit film layer and the associated circuit elements on the back surface of the middle Doosan® flexible PC circuit film layer;

DETAILED DESCRIPTION

Figure 1:
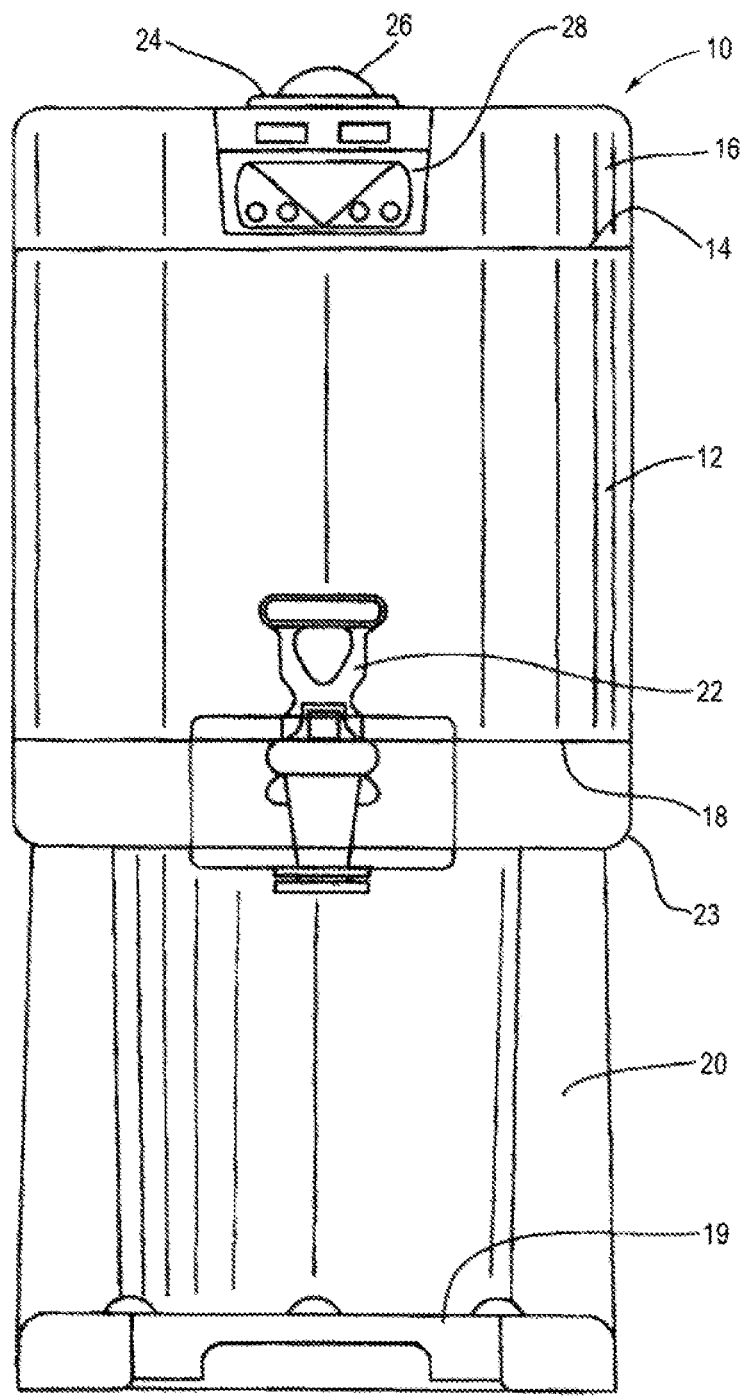
FIG. 1 is a front elevation view of a hot beverage dispenser with the beverage level display system mounted of the present invention mounted to the dispenser.

Referring to FIG. 1, shown is a beverage dispenser 10 with which the beverage level sensing system including a display 28 may be used. The beverage dispenser has a cylindrical, insulated body 12 with a top 14 closed by a cover 16. A bottom 18 of the body 12 is supported in cantilever fashion above a drip tray 19 by a support assembly 20. A manually operable faucet 22 attached to a bottom skirt 23 surrounding the bottom is used to dispense beverage into coffee cups or other containers placed on the drip tray 19. The removable cover has an inlet 24 for direct receipt of beverage from a mating beverage brewer. A pivotally mounted closure member 26 closes the inlet 24 after the dispenser body has been filled and before it is moved apart from the associated brewer to a serving location. The electronic display 28 is preferably a liquid crystal display that provides a visual indication of the quantity of beverage remaining within the insulated body 12 in graphic or numerical form.

Figure 2:
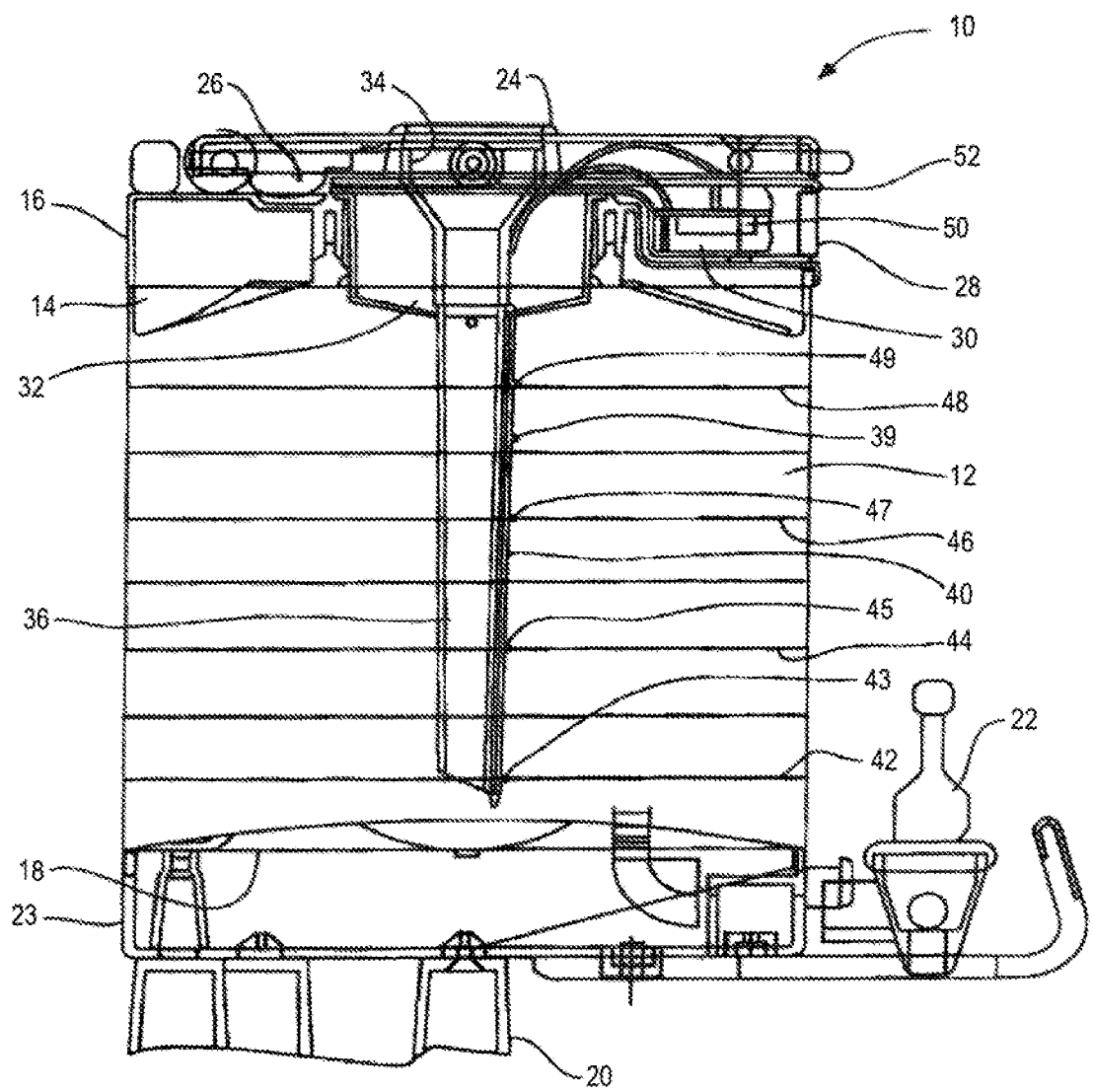
FIG. 2 is a cross-sectional side view of the dispenser of FIG. 1 and showing the relative spatial relationship of a funnel assembly, probe and display of the beverage level display system of the present invention.
Figure 3:
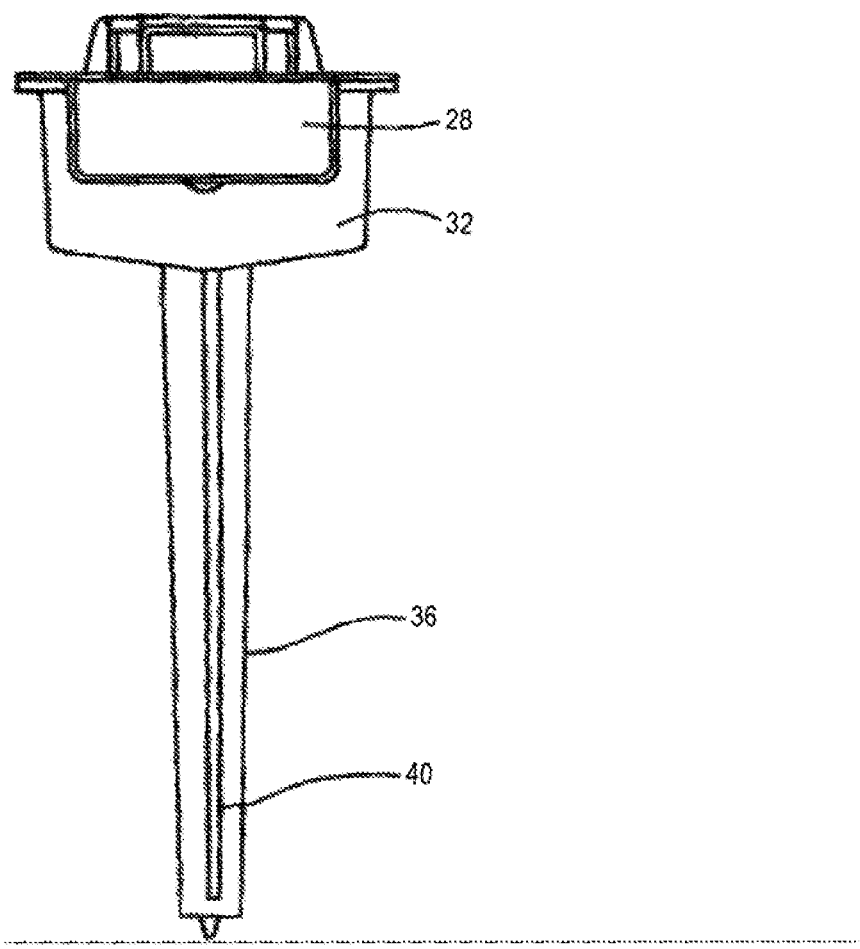
FIG. 3 is a front elevation view of the beverage level sensing system separated from the dispenser with which it is used.
Figure 13:
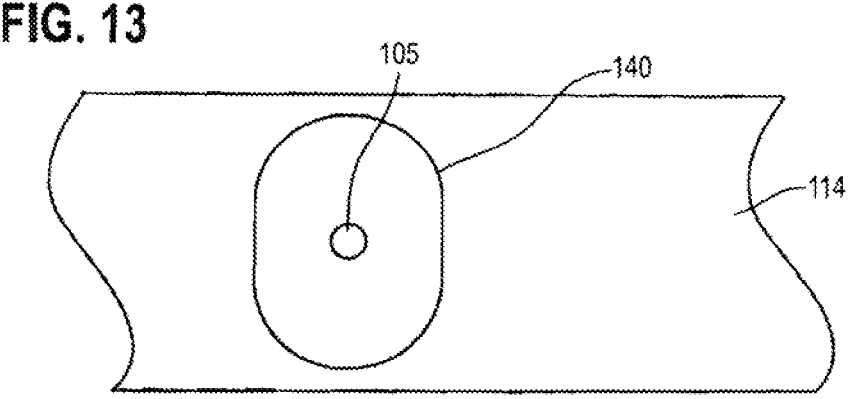
FIG. 13 is a plan view of a resistive sensing pad similar to that of FIG. 9.
Figure 14A:
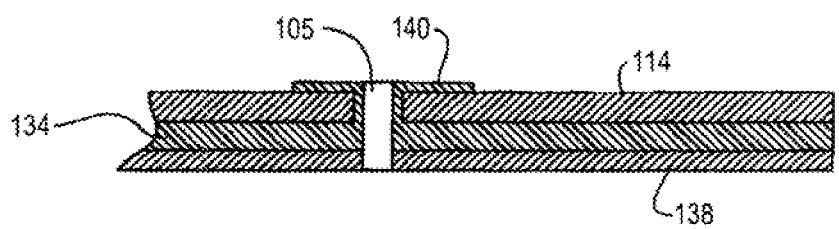
FIG. 14A is a sectional side view of the resistive sensing pad of FIG. 13 illustrating the through-hole connection with circuitry printed on the middle ply of the flexible resistive sensing circuit.
Figure 14B:
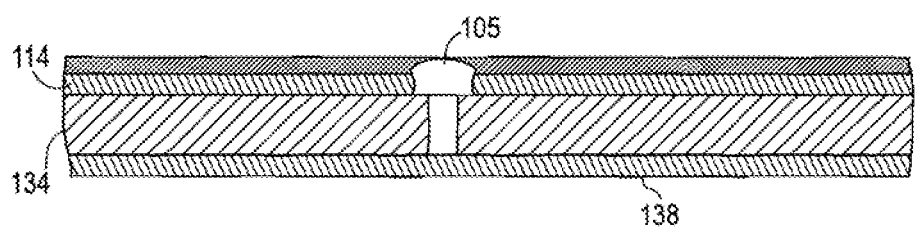
FIG. 14B is another sectional side view of a copper through-hole connector with a top cover overlying a Doosan Layer and a bottom layer underlying a trace layer and a copper through-hole connector extending from the top cover to the back cover.
Figure 15:
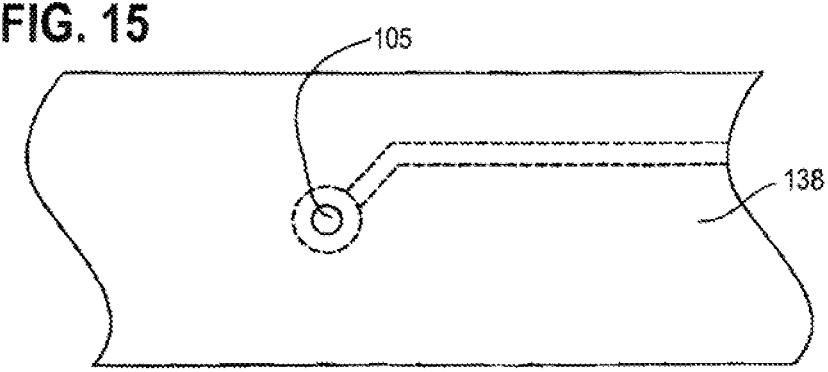
FIG. 15 is a bottom view of the section of flexible resistive sensing circuit.
Figure 16:
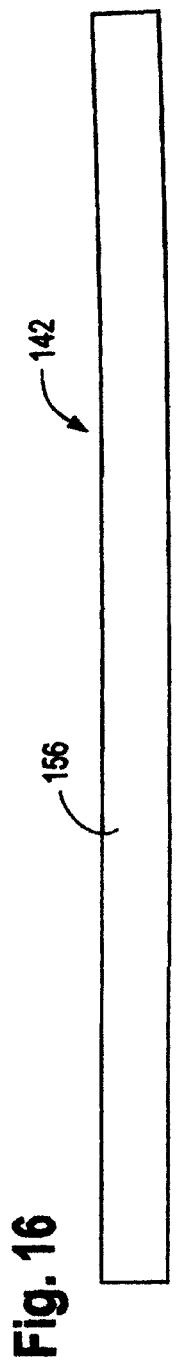
FIG. 16 is a view of the back covering Ultem® 1010F layer of a flexible capacitive sensing circuit that may be used in lieu of the flexible resistive sensing circuits of FIGS. 8-11.

Referring now to FIGS. 2 and 3, the display 28 is mounted to the front of an electronics housing, or compartment, 30 that is described in greater detail below with reference to FIGS. 4-7. The housing has two sections, one of which is a forwardly extending tongue of a removable funnel assembly 32. The funnel assembly 32 includes a funnel 34 of which the inlet 24 is a part that is removably fitted within a mating opening in the cover 16. An elongate down tube 36 extends downwardly from the funnel to a location adjacent the bottom 18. The down tube 36 also functions as a relatively, rigid probe body, or rigid sensor support member and is therefore also referred to herein as the rigid sensor support member, or probe. Attached to the elongate down tube, 36 and extending from adjacent the top 14 to adjacent the bottom 18 is an elongate level sensing flexible probe assembly 40. The flexible probe assembly 40 has a flexible probe body, or flexible probe support member 37 that is flexible relative to the relatively rigid probe body 36.

The flexible probe assembly 40 includes the flexible sensor support member 37 along which are located sensing locations 43, 45, 47 and 49 at a plurality of different levels above the bottom, such as levels 42, 44, 46 and 48 or more. The sensing locations 43, 45, 47 and 49 are locations at which are located conductive sensing lands, pads, or sensors used to electronically sense the contiguous presence of the beverage when at the same level as the associated sensing lands. These sensors may be either resistive or capacitive circuit elements.

Still referring to FIG. 2, each of the plurality of sensing pads has an individual conductive trace extending from the pad to a connection terminal at the upper most end of the flexible probe body 39. The end connector is connected via insulated wires to a controller 50 contained within the electronics housing 30. Also contained within the electronics compartment is a battery or capacitor source of power 52 and an interface between the conductive traces and the controller and between the output of the controller and the input to the display 28.

The display module 50 is integrated into the funnel assembly 32 together with the battery power supply 78 and the controller 62 to eliminate the need for interconnecting switches. This combined, or integral, structure also enables sealing all of the electrical elements together within the electronics housing and to enable removal of the display 50 and electronic elements as a single unit for replacement or repair.

Referring to FIGS. 4, 5, 6 and 7, the level sensing system of a resistive level sensing funnel assembly 100 is shown that is similar to the funnel assembly 32. The funnel assembly 100 employs a multilayered, flexible sensing circuit strip, or sensing circuit, 102 that is attached to the exterior of a down tube 104. The flexible sensing circuit strip 102 has a plurality of external conductive sensor pads, or sensors, 105 that are exposed at an exterior surface of the strip for contact with the beverage to change the resistance of the circuit as the beverage level changes to sense the different associated levels.

Preferably, both the flexible circuit strip 102 and the down tube 104 are made from Ultem® 1010F food grade material, and the flexible circuit strip 102 is thermally fused to the down tube 104 during the injection molding process in which the Ultem 1010F is heated to a fusion temperature of 670-690 degrees Fahrenheit with injection at a pressure of 1800-2000 psi. As seen in FIG. 6, a battery powered electronic display is connected to a connection end of the flexible sensing circuit strip 102 though a zebra connector 108 which is protectively housed within a box-shaped housing section 109. The housing section has a clear window to enable a view of the beverage level display. The box-like housing section 109 is attached to the underside of a forwardly extending relatively flat housing section 110 in a manner described below. A removable cap 112 carries a plug for the electrical zebra connector 108.

Referring to FIGS. 8, 9, 10, 11 and 12 the component parts of the three-ply flexible sensing circuit strip 102 is shown. The front cover layer 114 of FIG. 8 is made from an elongate strip of Ultem® 1010F that is approximately two mils thick with a plurality of four sensor access openings 105 for level sensing and two reference access openings 118 and 120. An access opening 122 is also provided for electrical connection of the flexible sensor circuit strip 102.

The four level sensing access openings, or through holes, 105 provide access of the beverage with four corresponding, underlying, substantially identical sensor pads 124 on the front surface 125 of a middle layer 127 to enable electrical contact with the beverage. Similarly, the two reference access holes 118 and 120 overlie and provide beverage access to two reference sensor pads 126 and 128 on the front surface 125. The connector access opening 122 provides access for connection of a zebra connector 130 connected with the six sensor pads 124. The connection of the sensor pads 124 is to a resistive detection display interface circuit which converts the signals from the sensors to display control signals that show the corresponding quantity of beverage within the dispenser body 12. Reference may U.S. Pat. No. 6,741,180, issued May 25, 2004 to Zbigniew G. Lassota for an invention in "Beverage Dispensing Urn with Electronic Display" and patents cited therein, which are hereby incorporated by reference, for details of a suitable interface circuit. Reference may also be made to U.S. application Ser. No. 12/250,963 filed Oct. 14, 2008, which is hereby incorporated by reference, and to other patent indicated herein for further details.

Referring to FIGS. 10 and 12, the back side 132 of the middle layer 127 carries six elongate traces, or leads, 134, of the invention and described below with reference to FIGS. 25 and 28-30 that are respectively connected by means of through-hole connections 136, FIG. 12, with the four sensor pads 124 and the two reference sensor pads 126 and 128 at one end and to the six connector pads 130 at the opposite ends. These traces are generally parallel to each other except at open location 131. At location 131, the traces are expanded to prevent destruction of the traces by plastic flow from the injection gate at this position during construction of the probe assembly that might otherwise occur if the traces passed through the open location 131.

These leads 134 are protectively covered by a back-cover layer 138 made from Ultem® 1010F that is two mils thick. The main layer, or middle layer, 26 is made from Doosan® flexible PC circuit film, or equivalent, and is approximately one to three mils thick.

After the three layers 114, 127 and 138 are assembled and aligned and the cross connections 136 are established, the three layers are fused together to form the single flexible resistive sensing circuit strip 102. Preferably, the down tube 104 is also made from Ultem® 1010F and the flexible resistive sensing circuit strip is attached to the front wall of the down tube 104, as shown in FIG. 4 by thermal fusion during injection molding of the down tube 104, as will be explained below in greater detail. In the case of fusion, the material of the outside layers 114 and 138 must be made of the same material as the down tube 104 so that they have the same melting temperature, while the middle layer 127 is made of a material, such as Doosan® that has a higher melting temperature.

Referring to FIGS. 13, 14A, 14B and 15, the access openings 105, 118 and 120 may be surrounded by conductive pads 140 and may pass through the backcover layer 138. The pads are preferably made from hard gold or palladium plated over a conductive material from which is also made the traces and the through-hole connections. Layer 114 is made of Doosan. The middle layer 134 is the trace layer. The back of the middle layer 138 is adhered to the top of the inside bottom layer by means of a high temperature adhesive which is heat resistant to approximately 630-degrees Fahrenheit.

Referring to FIGS. 16, 17, 18 and 19, a flexible capacitive sensing circuit 142 may be substituted for the flexible resistive sensing circuit 105. The capacitive sensing circuit has a top cover layer 144 with an access opening for access to five connector pads 146 to connect to level determining circuitry. However, there are other access openings to any sensing pads, for capacitive sensing does not require direct contact with the beverage for sensing. The top cover layer 144 is made of ULTEM® 1010 food grade material.

Figure 17:
FIG. 17 is a front view of a middle Doosan® flexible PC circuit film layer back cover layer of the flexible capacitive sensing circuit showing the locations of a plurality of capacitive plates and traces leading from the respective capacitive plates to an associated plurality of connectors.
Figure 18:
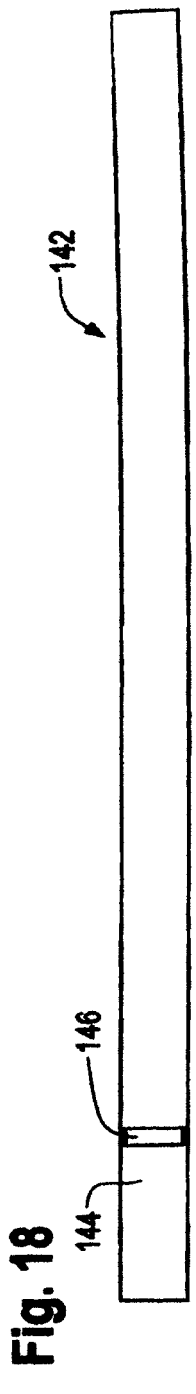
FIG. 18 is a front view of a top cover of Ultem® 1010 of the flexible capacitive sensing circuit with an access opening for external access to the connectors of the middle layer of FIG. 17.

The main, or middle, layer 148 has five substantially identical capacitor plates 150 on the top side shown in FIG. 17 with an associated five conductive traces 152 that are connected to five associated connection pads 154. Only a single plate is used for each level which forms a capacitor with the side of the metal, preferably stainless steel, body of the dispenser 10. The capacitance changes when the beverage is at the level of the one capacitor plate as opposed to when the beverage is absent.

Again, these plates may be constructed of a screen-printed conductive polymer with copper or gold plated over nickel. The middle layer 148 is made from Doosan® flexible PC circuit film and is approximately one to three mils thick. The back cover layer 156, like the top cover 144, is made of Ultem® that is approximately two mils thick and is adhered to the back side of the middle Doosan® flexible PC circuit film layer 148, while the top cover layer 144 is adhered to the front side of the Doosan® flexible PC circuit film layer 148. The access opening 146 is aligned with the connectors 154 to provide access to the connectors 154.

Figure 19:
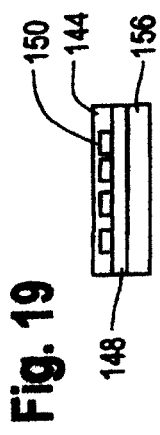
FIG. 19 is an end view of the flexible capacitive or resistive sensing circuit showing the location of the capacitive or resistive sensor plates protectively embedded between the middle layer of FIG. 17 and the top cover layer of FIG. 18.

As seen in FIG. 19, since there is no need for access openings to the capacitive sensors since the capacitance change does not require contact with the beverage. Accordingly, all the capacitive plates, or sensors 150 are protectively enveloped or encased between the top of the middle layer 148 and the top cover layer 164. The flexible capacitive sensing circuit may be used with a capacitive sensing circuit such as shown in US patent application US 2006/0106547 A1 Published May 28, 2006 of Szela et al. for "Electronic Method and System for Detection of Conducting or Dielectric Medium with Dielectric Constant Higher than That of Air". Reference may also be made to U.S. Pat. No. 7,798, 373, issued Sep. 21, 2010 for an invention in an "Airpot Beverage Dispenser with Flow Thorough Lid and Display and Method" and patents cited therein, all of which are hereby incorporated by reference. Reference may also be made to U.S. patent application Ser. No. 12/731,436 filed Mar. 25, 2010, for further details concerning interface circuitry.

Unlike the fragile traces used in the past, such as those used in the level display systems shown and described in the aforementioned U.S. patents, which were formed from ordinary copper film electro-deposited onto substrate and then chemically etched to form the traces, the traces of the present invention are formed from rolled annealed (RA) copper. The rolled annealed copper has a macrocrystalline structure with elongate, metal, granule-like, cohered metal elements that are aligned with each other in generally parallel relationship. Unlike the electro-deposited traces used in the past which have a grain structure with sharp mountain-valley like formations at the surfaces, rolled annealed copper 197 has a horizontal grain structure that is elongate and aligned with the surface of the trace, such as schematically shown in FIGS. 25, 28, 29 and 30. It has been found that this elongate and parallel alignment of the macroscopic structure of the traces substantially reduces the risk of fracturing, cracking and crack propagation when the rolled copper trace is bent relative to such risk traces of electro-deposited copper.

Figure 24:
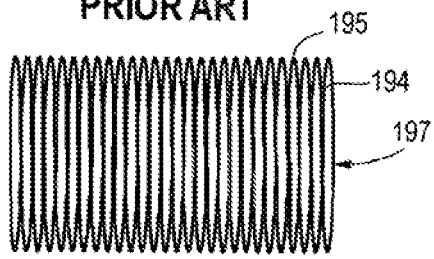
FIG. 24 is a schematic, enlarged illustration of unrolled electro-deposited (ED) copper that is deposited on an insulating substrate to form conductive traces used with the level sensing probes of the PRIOR ART and which have a vertical grain structure with sharp mountain-valley like formations at the surfaces.
Figure 25:
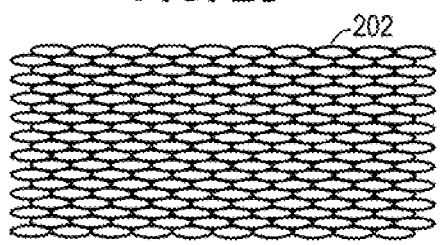
FIG. 25 is a schematic enlarged illustration of the rolled-annealed (RA) copper used to form the conductive traces in the level sensing probe of the present invention showing the horizontal grain structure that is elongate and aligned with the surface of the trace to reduce the risk of fracturing, cracking and crack propagation when bent relative to the risk of such fracturing, cracking and crack propagation in traces made using ED copper.
Figure 26:
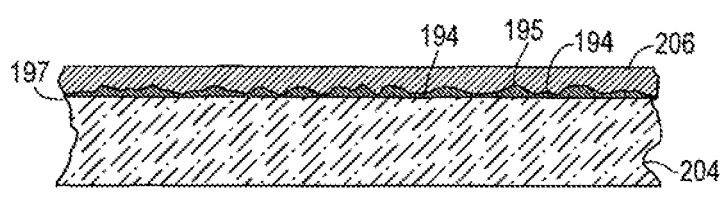
FIG. 26 is a schematic illustration of an ED copper trace of a trace array of the PRIOR ART probe that has been electro-deposited onto a suitable flexible substrate which shows the irregular surface with vertical mountain and valley-like configurations that contribute to the risk of damage to the trace when bent when the flexible substrate is bent or otherwise stressed or strained.
Figure 27:
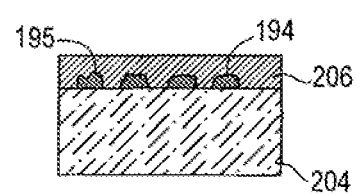
FIG. 27 is an end view of the PRIOR ART trace array of FIG. 26 taken through section line 27-27 of FIG. 26.
Figure 28:
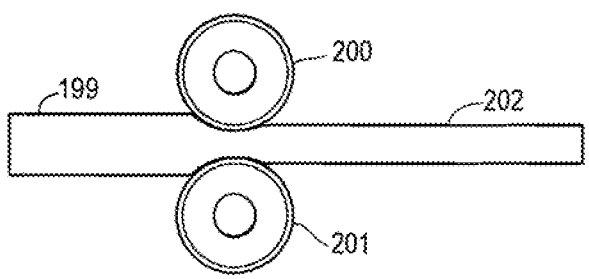
FIG. 28 is a schematic illustration of the process of rolling a copper sheet form rolled annealed copper with a grain structure with elongate grains or granules that are aligned parallel to the surface of the trace to make the trace less susceptible to damage due to bending.
Figure 29:
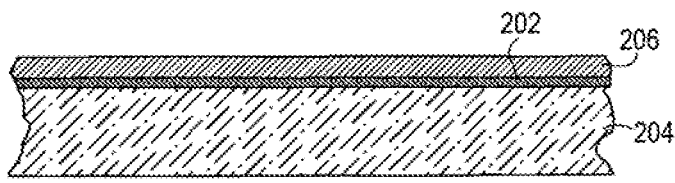
FIG. 29 is a is a schematic illustration of an RA copper trace of a trace array of the present invention that has been attached to the surface of a flexible substrate which shows the smooth surface without the weakening vertical mountain and valley-like configurations of the ED copper of FIGS. 26 and 27 that contribute to the risk of damage when the flexible substrate and trace bent or otherwise stressed or strained.
Figure 30:
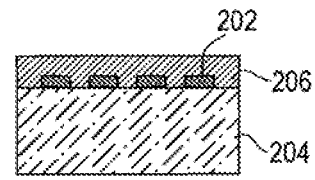
FIG. 30 is an end view taken through section line 30-30 of FIG. 29.

As illustrated in FIG. 28, the parallel structure is achieved by rolling a sheet of regular copper 202 between a pair of high compression rollers 200 and 201 with sufficient force needed to create the desired elongate parallel structure of the rolled copper 202. The hills 195 and valleys 194, FIGS. 24 and 26, that extend transversely to the plane of the ordinary unrolled copper trace are removed.

As with the regular ED copper trace 197, the RA traces are rolled and adhered on both sides to a suitable flexible non-conductive substrate 204, such as Doosan- and are covered by protective layer 206 of Ultem®.

Figure 20:
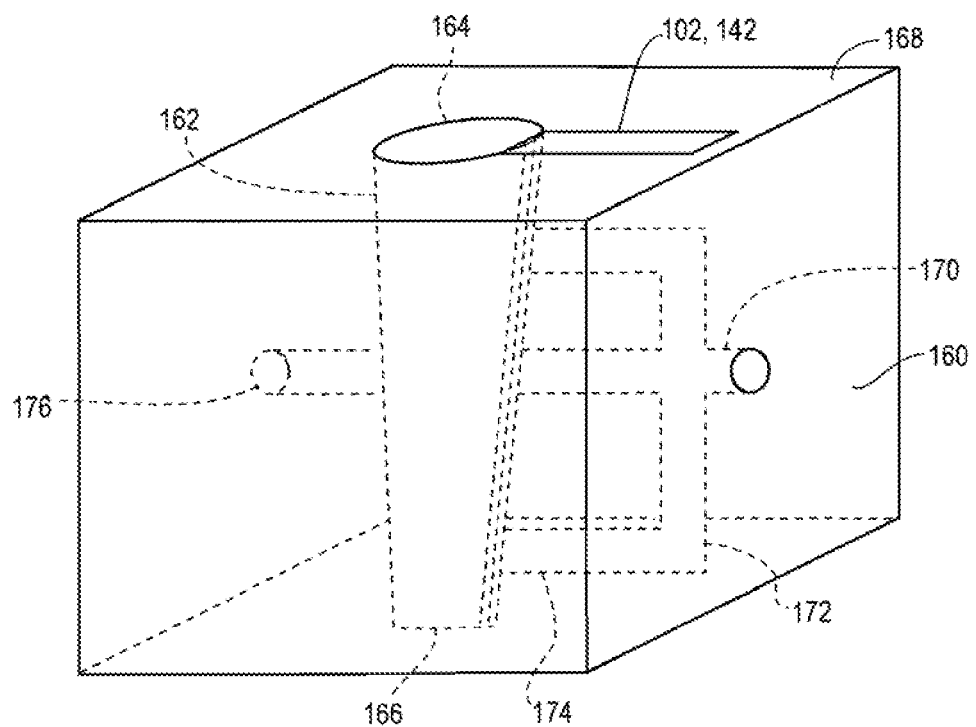
FIG. 20 is a schematic illustration of the mold piece that is used to define the outside walls of the down tube in combination with the flexible resistive circuit or the flexible capacitive circuit prior to attachment of the complimentary mold piece and thermal injection molding of the down tube with the flexible circuit thermally fused to the side of the down tube while held in place by vacuum suction.

Referring to FIG. 20, as indicated above, the flexible sensing circuits 102 or 142, whether resistive or capacitive, are preferably made from the same food grade material as the down tube 104 such that they may be thermally fused together in one step during injection molding of the down tube 104. In such case, a main mold piece 160 has a mold cavity 162 with a side wall that conforms to the exterior surface of the desired shape of the down tube 104 with a top opening 164. The flexible circuit 102 or 142 is lowered through the opening 164 until the bottom end is adjacent the bottom 166 of the cavity and the top end with the connectors is resting on the top 168 of the cavity 162.

Another mold piece (not shown) corresponding to the inside wall of the down tube 104 is then lowered into the cavity 162 and tightly secured to seal the top opening 164 closed with the flexible circuit located along the inwardly facing wall of the cavity 162 with the back surface facing inwardly and the front face with the sensors facing outwardly against the inwardly facing surface of the mold cavity 162. The portion of the flexible circuit resting on the top 168 of the mold piece 160 rests within, and is kept properly aligned by means of an upwardly facing groove that curves slightly into the opening 164 to prevent squeezing of the upper portion of the flexible circuit when the top portion of the mold is fastened to the top 168 of the mold piece 160.

Vacuum is applied to an input port 170 of a vacuum manifold 172 with a plurality of output ports 174 aligned with the position of the flexible circuit 102 or 142 to hold it in place against the wall during the injection molding process. After the mold is closed and the vacuum applied, the Ultem® 1010F is heated and injected into the cavity 164 through an injection port 176 until the cavity is filled and the flexible circuit has been thermally fused against the side of the down tube 104. After the mold has cooled, the pieces are separated and the finished down tube 104 removed from the cavity 162. The top of the down tube 104 is later connected with the upper housing in which the electronic controls are located.

Figure 21:
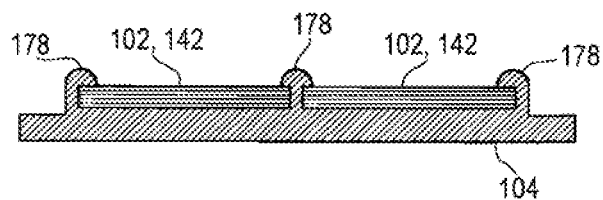
FIG. 21 is a sectional end view of a flexible circuit that is mechanically attached to a down tube with integrally formed grooves and overmolded retention tabs.
Figure 22:
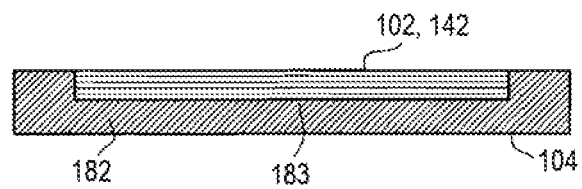
FIG. 22 is a sectional side view of another flexible circuit as adhesively attached or glued within an integrally formed groove.
Figure 23:
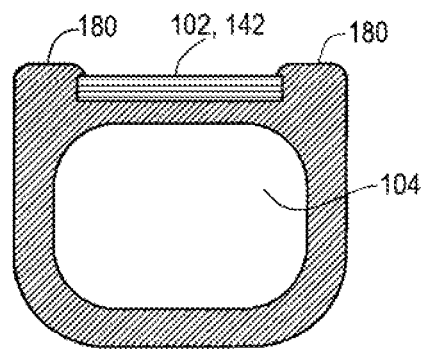
FIG. 23 is another section side view of another flexible circuit as mechanically attached and held within a groove by retention tabs integrally formed and overmolded with the down tube.

Referring to FIGS. 21, 22 and 23, in lieu of thermal fusion, the flexible sensor support 204 may be mechanically attached to the exterior of the down tube 106. In FIG. 21, the flexible circuit 102 or 142 is held to the exterior surface of the down tube by four overhanging tabs 178. In FIG. 23, the flexible circuit 102 or 142 is held in place by a pair of tabs 180 on opposite sides of the flexible circuit. In FIG. 22, the flexible circuit is attached to the bottom of a mating groove 182 formed in the side of the down tube 104 by a suitable thermal fusion joint 183. Alternatively, but not preferably, temperature resistant adhesive suitable for use with food may be used in lieu of the thermal fusion joint.

Referring to FIG. 21 over molding is illustrated. Tabs 178 may be hooked to hold the electronic member. Alternatively, the tabs 178 may be straight, and the electronic member s 120 and 142 are placed in position and then heat-staked by heating and molding the tabs to the hooked state to hold the electronic members 120 and 142.

FIG. 22 shows an adhesive application to hold the electronic members 120 and 142

FIG. 23 shows another over molded or alternatively heat-stake attachment technique.

Another important aspect of the invention which further reduces the risk of the traces is bonding the two housing sections together by means that avoids damaging vibrations to the traces and other electronics caused by vibrations from ultra-sonic welding together of the two housing sections while also achieving comparable or better sealing against the entry of moisture into the electronics housing.

Referring to FIGS. 35-38, the electronics housing 109 is an assembly of two housing section, an upper, generally flat forward extending mounting member, or housing section 110 extending outwardly from a circular plate that mounts to the dispenser a lower, generally box-shaped, lower section 109 which contains the electronics module 108 with an attached electronics display, a portable power supply, or battery 214, and connectors with the traces from the level sensors mounted along the length of the rigid, sensor support member, or down-tube 104.

Figure 35:
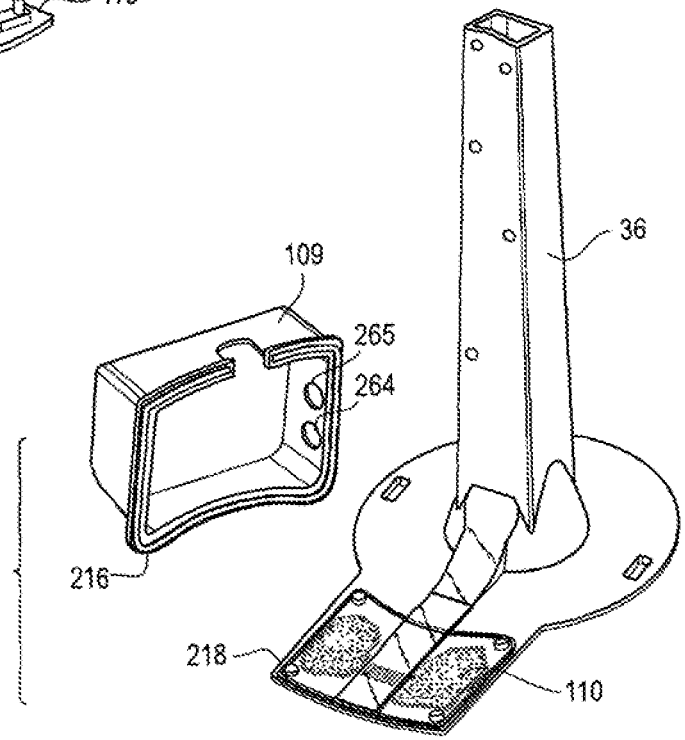
FIG. 35 is another partially exploded perspective view of the beverage level sensing system illustrating the connective mating surfaces of the two housing sections, entry ports for passage of the flexible sensor support member into the box-shaped housing section for connection of the traces with the controller electronics therein.

As best see in FIG. 35, the housing section 109 and 110 have congruent, mating, surfaces 216 and 218, respectively, as best seen in Fig. These mating surfaces 216 and 218 are defined by matching tongue 220 and groove 224 mating connectors.

Figure 36:
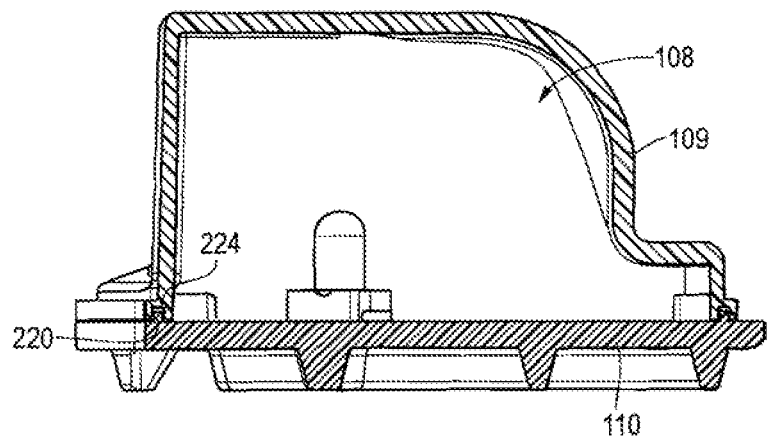
FIG. 36 is a sectional side view of the housing after the two housing sections have been joined together along their tongue and groove connective, mating surfaces.
Figure 37:
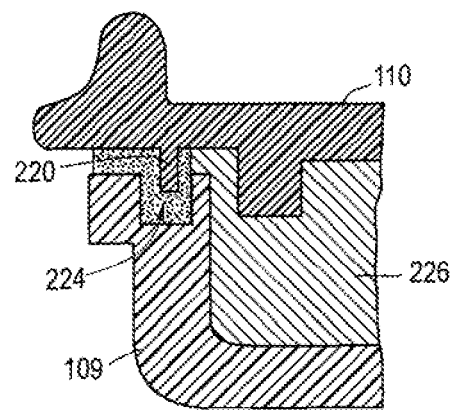
FIG. 37 is an enlarged sectional side view of the housing of FIG. 36 illustrating the comingling of the adhesive and the adhesive potting compound binding together and sealing the connective tongue and groove mating surfaces of the two housing sections of FIG. 36.
Figure 38:
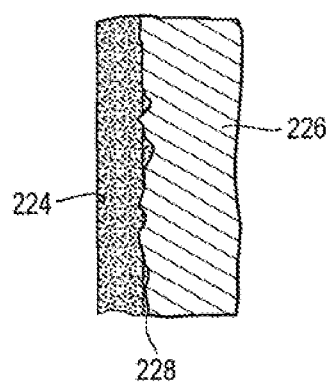
FIG. 38 is a further enlarged horizontal cross-sectional view of a portion of the tongue and groove connection of FIG. 37 illustrating the manner in which adhesive potting material fills in any gaps or voids in the adhesive layer between the connective mating surfaces after the method described with reference to FIG. 31.

Referring to FIGS. 36, 37 and 38, the objective of providing a more secure sealed attachment of the two housing sections is achieved by means employing a food safe adhesive 230 that is inserted into the groove 224 and an adhesive potting material with adhesive properties, such as Henkel LOCTITE SI 5900. As seen in both FIGS. 37 and 38 both the adhesive 224 and the potting material 226 are in contiguous and continuous contact within the groove 224 with the potting material filling in any gaps or voids in the line of adhesive, or glue line 228. The filling in of adhesive gaps or voids is achieved by the novel method described below and results in a stronger bond between the two housing sections 109 and 110 and a better sealing against the entry of damaging moisture and corrosive materials into the housing than can be achieved when there is no such comingling of adhesive and potting material. In addition, the potting material 226 with adhesive properties substantially fills the entire the electronics module housing and protectively envelopes the electronic circuit to further reduce the entry of water or moisture into contact with the in the event and to buffer and protect against mechanical forces due to rough handling.

This combination of adhesive 224 and potting material 226 can be considered to be a composite adhesive layer interposed between the mating surfaces since the potting material has adhesive properties and performs a dual function. However, unlike combining different adhesives by blending in accordance with the present invention the adhesive and potting material being unblended but comingled in contiguous relationship between the mating surfaces, but are unblended.

Further reducing the risk of damage to the electronics or the traces leading between the level sensors and the display electronics and in keeping with another objective of the present invention beverage level display system of claim 1 in which the adhesive and the potting material have a first and second coefficients of thermal expansion, respectively, which are substantially the same. In addition, preferably the housing has a third coefficient of thermal expansion that is substantially the same as the first and second coefficients of thermal expansion.

Figure 31:
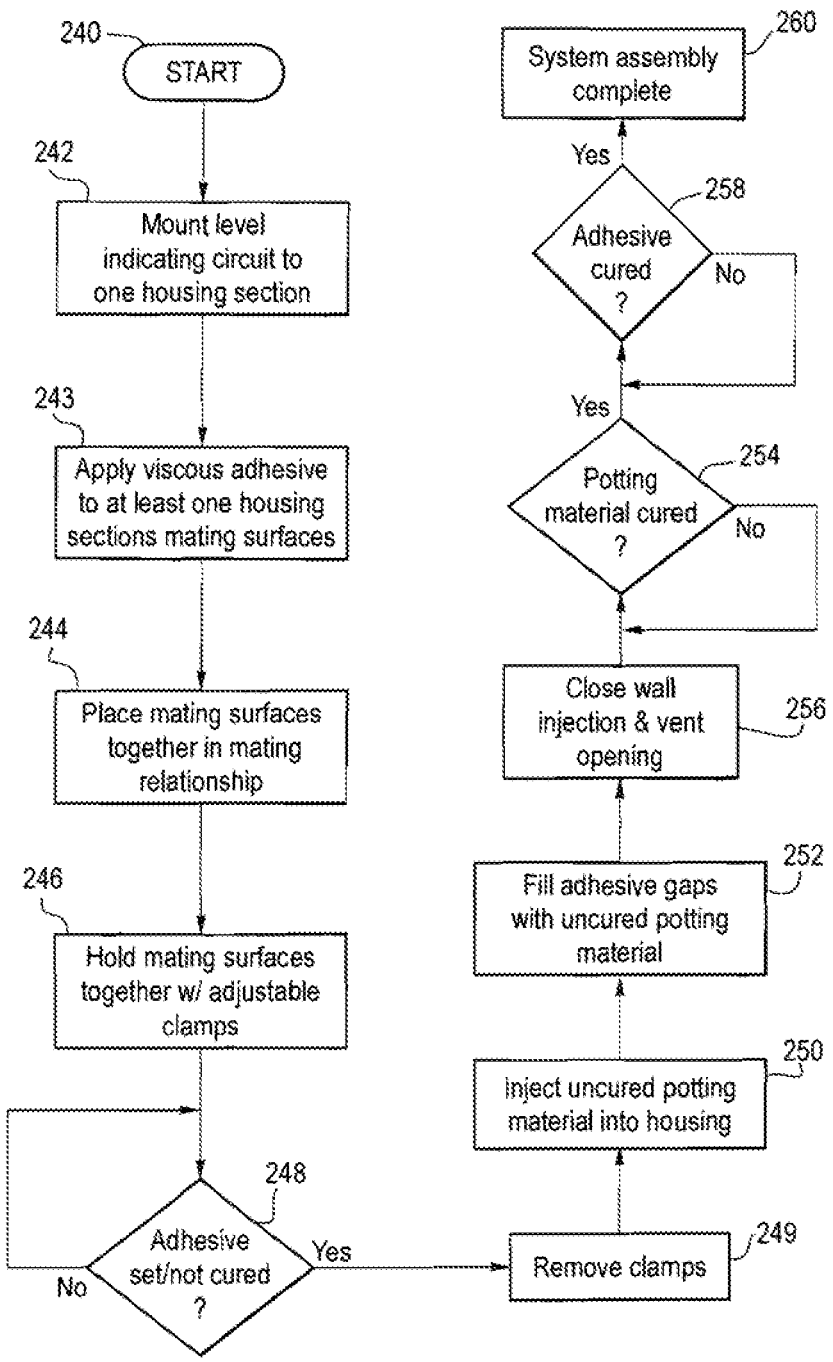
FIG. 31 is a functional logic thawing showing the method of assembling the level sensing probe assembly to reduce the risk of damages to the sensor array.

Referring now to FIG. 31, shown is the method of the present invention by which the adhesive and potting material comingling structure shown and described above with respect to FIGS. 37 and 38 is achieved. After the beginning or start 240, in step 242 the beverage level display electronics electronic module 106 with the battery or capacitor power supply and display is mounted within box-like housing section, 109. Next, in step 243 a line of the adhesive while in a viscous state is applied into the groove 224 of housing section 109. In step 244 the two housing sections are joined together in mating relationship with the tongue 220 being inserted into the groove 224. If the glue line application is applied too sparingly, then the glue line may have voids or gaps.

Figure 32:
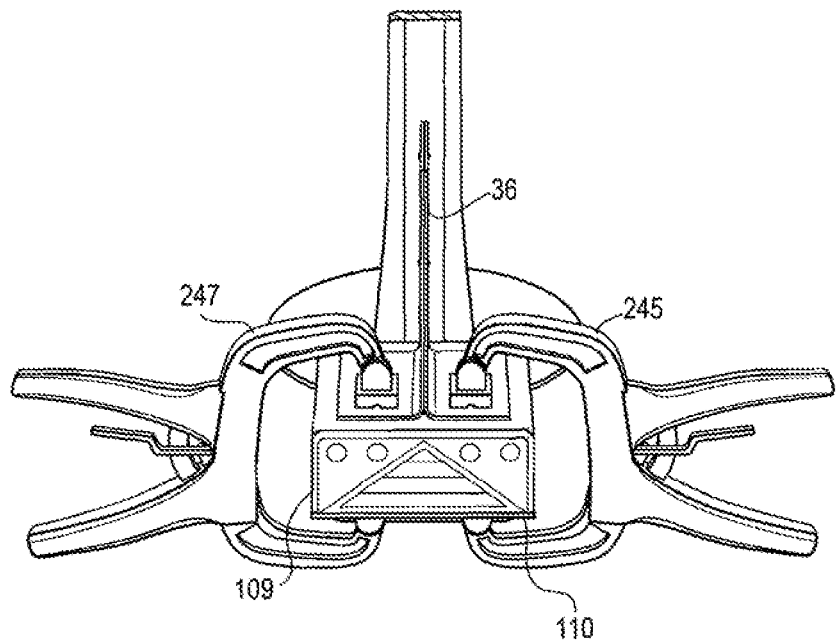
FIG. 32 is a side elevational view of the level sensing probe with clamps holding mating section together during setting and curing of adhesive and potting material.
Figure 33:
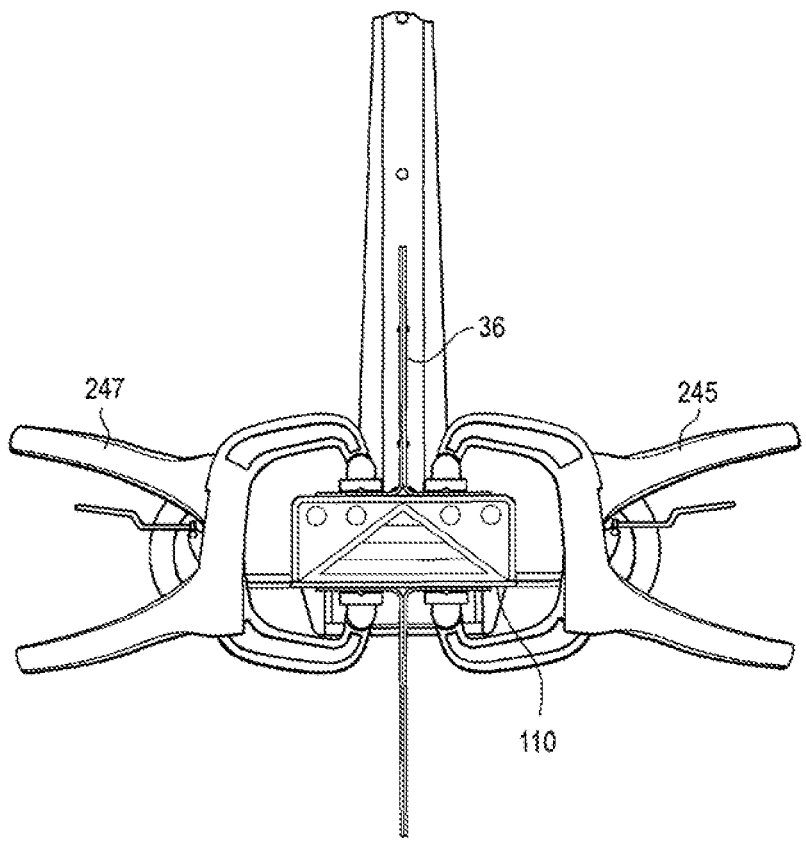
FIG. 33 is a plan view of the level sensing probe with clamps of FIG. 33.

Then, in step 246, the two housing sections are held together in mating relationship by clamps 245 and 247, such as those shown in FIGS. 32 and 33. In step 248, a time period is allowed to pass while the housing sections remain clamped that is sufficient for the adhesive to set, but not so long that the adhesive is cured and hardened. Once the adhesive is cured and capable holding the two housing sections adhered together without the need for clamps 245 and 247, uncured, viscous adhesive potting compound, or material, is injected into the housing through an injection hole 264, FIG. 34, in box-like housing section 109. In step 252, the injection continues for a sufficient time and pressure to ensure that any gaps or voids in the line of adhesive are filled in with uncured potting material as needed to provide improved bonding a more complete seal.

Injection of Dow Sylgard 275 potting material under low pressure has been found adequate to achieve the desired comingling to achieve adhesive gap and void filling. Injection at relatively low pressure for a few seconds has also been found to be adequate. Preferably the adhesive is HENKEL LOCTITE SI 5900 and the potting compound is Dow Sylgard 275.

Figure 34:
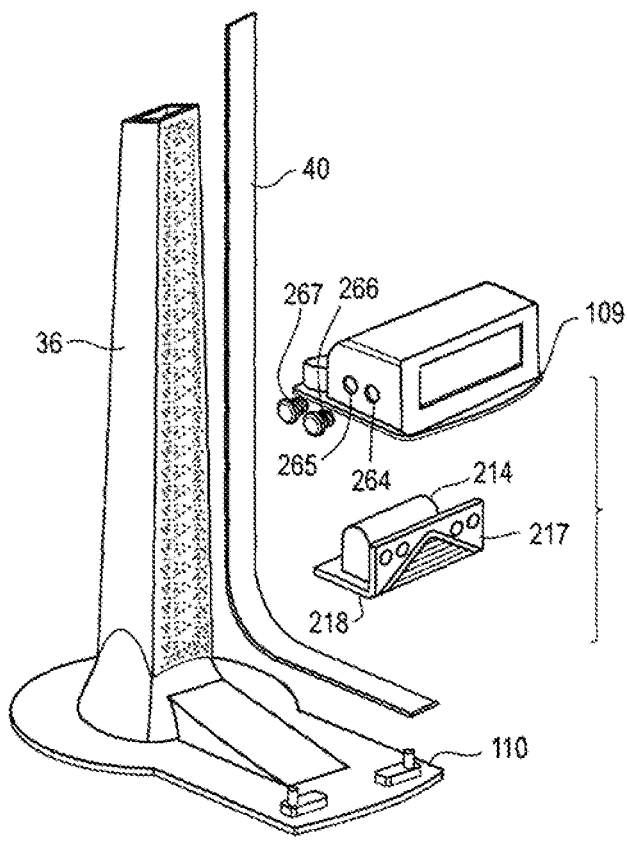
FIG. 34 is another exploded view of the beverage level sensing system in an inverted orientation.

Once the housing has been filled with the uncured potting compound, in step 256 the injection port 264 and the vent port 265 opening, FIG. 34, are closed with plugs 266 and 267, respectively. Next, in steps 254 and 258, a sufficient time is allowed to pass to ensure that both the adhesive and the potting compound have synergistically cured together and both are fully cured and hardened to form a strong adhesive attachment and a moisture impermeable seal. The assembly process is then complete at step 260

Next, in step 258 a determination is made whether the adhesive is cured. When sufficient time has passed be confident that the adhesive is cured, then in step 262, the clamps 245 and 247 of FIGS. 32 and 33 are removed and the assembly process is complete.

Because, unlike the use of ultrasonic welding, the assembly method illustrated in FIG. 31 is a low impact method that avoids the risk of damage to the traces and the other electronics due to damaging high frequency vibrations mechanical vibrations caused by ultrasonic welding of the housing sections. Further reducing the risk of damage due to ingress of moisture, humidity. etc., the method of synergistically using adhesive and the potting compound creates a tighter seal between the two housing sections than be achieved by the use of adhesive alone or by ultrasonic welding.

While particular embodiments of the flexible sensing circuits, the method of attachment of the sensing circuits to the down tube by thermal fusion and other attachment means and the method of making the flexible circuits have been disclosed, many obvious variations may be made thereto with departing from the scope and spirit of the invention. For example, while the flexible level sensing circuits have been disclosed with respect to use with a down tube of funnel assembly used with a beverage dispenser, it should be appreciated that the method of attaching the circuits to the down tube by thermal fusion to a solid substrate other than a down tube for level sensing could otherwise be used. Reference should therefore be made to the following claims with respect to the breadth and scope of the present invention.

The invention claimed is:

1. A hot beverage level display system for use with a hot beverage dispenser, said display system having at least one level sensing element, an electrical display for showing an indication of the level of beverage within the dispenser, an electronic circuit mounted within an electronics module housing that is responsive to signals from the at least one level sensing element for controlling the electronic display to show the level and an elongate relatively rigid probe body carrying at least one elongate electrically conductive trace interconnecting the at least one level sensing element with the electronic circuit, an improvement to the level display system, the improvement, comprising:
   a quantity of potting material with adhesive properties substantially filling the electronics module housing and protectively enveloping the electronic circuit;
   a pair of housing sections respectively with a pair of mating surfaces; and
   a composite adhesive layer interposed between the mating surfaces to permanently affix together the pair of housing sections to form the housing module, said adhesive layer being a combination of both an adhesive and some of the potting material filling the electronics module housing, both the adhesive and some of the adhesive potting material being unblended but combined in contiguous relationship between the mating surfaces.

2. The hot beverage level display system of claim 1 in which the adhesive interposed between mating edges of the two mating mounting sections has gaps or voids that are filled in by the potting material to enhance sealing against moisture and securement together of the at least two housing sections.

3. The hot beverage level display system of claim 1 in which the adhesive and the potting material have a first and second coefficients of thermal expansion, respectively, which are equal.

4. The hot beverage level display system of claim 3 in which the housing has a third coefficient of thermal expansion that is equal to the first and second coefficients of thermal expansion.

5. The hot beverage level display system of claim 1 in which the adhesive has a first coefficient of thermal expansion, and
   the housing sections have a third coefficient of thermal expansion that is equal to the first coefficient of thermal expansion.

6. The hot beverage level display system of claim 1 in which
   the potting material has a second coefficient of thermal expansion, and
   the housing sections have a third coefficient of thermal expansion that is, equal to the second coefficient of thermal expansion of the adhesive and potting compound.

7. The hot beverage level display system of claim 1 in which
   said at least one trace interconnecting the at least one level sensing element with the electronic level determining circuit is formed from metallic film having macrocrystalline structure with elongate, metal, granule-like, cohered metal elements that are aligned with each other in generally parallel relationship.

8. The hot beverage level display of claim 7 in which the elongate, metal, granule-like, cohered metal elements are aligned with the elongate direction of the elongate trace.

9. The hot beverage level display system of claim 1 in which the at least one elongate trace is made from rolled copper film.

10. The hot beverage level display system of claim 1 in which the at least one elongate trace is rolled onto a substrate.

11. The hot beverage level display system of claim 10 in which the elongate trace has one coefficient of thermal expansion, and
   the substrate has another coefficient of expansion that is equal to the one coefficient of expansion.

12. The hot beverage level display system of claim 10 in which the elongate trace is imbedded into the substrate.

13. The hot beverage level display system of claim 12 including an adhesive layer on one side of the substrate.

14. The hot beverage level display system of claim 1 in which the at least one trace is sandwiched between two layers of substrate.

15. The hot beverage level display system of claim 1 in which the potting material has an adhesive strength of at least twenty pounds.

16. In a hot beverage level display system for use with a hot beverage dispenser and having at least one level sensing element, an electrical display for showing an indication of the level of beverage within the hollow body, an electronic circuit responsive to signals from the at least one level sensing element for controlling the electronic display to show the level, the improvement, comprising:
   an elongate relatively rigid probe body carrying at least one elongate electrically conductive trace interconnecting the at least one level sensing element with the electronic circuit, said conductive trace formed from rolled metal film having a macrocrystalline structure with elongate, metal, granule-like, cohered metal elements that are aligned with each other in generally parallel relationship; and
   a housing surrounding the electronic circuit formed of at least two housing sections with mating surfaces that are attached to each other in mating relationship by a food-safe adhesive potting material with adhesive properties that is interposed in bonding relationship between the mating surfaces, said housing sections having first and second coefficients of thermal expansion, that are equal and said adhesive potting material having a third coefficient of thermal expansion that is equivalent to the first and second coefficients of thermal expansion.

17. The hot beverage level display system of claim 16 in which the adhesive potting material is one of the following adhesives or an equivalent: 3M PR-100, DP-100; Henkel Locite®380, 4014; UO9FL; SI 5900; AA H3300; Super Glue-Gel Control or AXIS® 84210.

18. The hot beverage level display system of claim 17 in which first, second and third coefficients of linear thermal expansion (CLTE) are within a range of 3.0E-5 to 3.1E-5 (in/in F°).

19. The hot beverage display system of claim 16 including substantially water and heat impervious potting material substantially filling the housing and enveloping the electronic housing, said potting material having a coefficient of thermal expansion that is equivalent to the third coefficient of thermal expansion.

20. The hot beverage display system of claim 19 in which the potting material has adhesive properties, and
some of the potting material is interposed between the mating surfaces together with the adhesive and filling voids in the adhesive interposed between the mating surfaces to improve the strength of the bonding and sealing together of the mating surfaces beyond that achievable with only the adhesive.

21. The hot beverage display system of claim 16 in which the conductive trace is mounted to a flexible substrate with a fourth coefficient of thermal expansion that is equivalent to the first, second and third coefficients of thermal expansion.

22. In a hot beverage level sensing probe for measuring the level of beverage contained inside an opaque hollow body of a hot beverage dispenser, said sensing probe having an elongate sensor support member carrying at least one liquid level sensor, an electronics module for processing electrical signals from the at least one level sensor to determine a water level for display, and a display connected with the electronics module for displaying the level determined by the electronics module based upon the electrical signals, the improvement being an electrical link, comprising:
an elongate, electrically conductive trace made of a metal rolled to have a microscopic, parallel-directed crystalline structure; and
an adhesive securing the electrically conductive trace to the elongate sensor support member and extending along the sensor support member in connected, conductive electrical contact between the at least one liquid level sensor and the electronics module.

23. The hot beverage level sensor probe of claim 22 in which the sensor carrying member is a relatively inflexible elongate member that extends in an elongate direction extending between the sensor and the electronic module.

24. The hot beverage level sensor probe of claim 23 including a layer of polyimide overlying one side of the rolled metal and in which the polyimide layer is mounted to the elongate sensor support member.

25. The hot beverage level sensor probe of claim 24 including another layer of polyimide overlying another side of the electrically conductive trace the one side of the electrically conductive trace.

26. The hot beverage level sensor probe of claim 24 including a layer of adhesive located intermediate the layer of polyimide and the sensor carrying member.

27. The hot beverage level sensor probe of claim 22 in which the parallel-directed, crystalline structure is directed along and generally parallel with the elongate direction of the sensor carrying probe.

28. The hot beverage level sensor probe of claim 22 in which the rolled metal is copper.

29. The hot beverage level sensor probe of claim 22 in which the rolled metal is rolled copper that has been etched.

30. The hot beverage level sensor probe of claim 22 in which the rolled metal is pressed into a layer of polyimide overlying one side of the rolled metal.

31. A method of making the hot beverage level display system of claim 1, comprising, in order, the steps of:
mounting the electronic circuit to one of the pair of housing sections that form the housing when mating surfaces of the housing sections are joined in mating relationship;
applying a food-safe, adhesive of the adhesive layer between the mating surfaces of the two mating housing sections;
placing the mating surfaces in mutual engagement to form the electronics housing and holding the mating surfaces together in mutual engagement until the adhesive sets;
after the adhesive has set, but before the adhesive has fully cured into a fully dried state, injecting uncured potting material into the electronics housing to protectively enclose and protect the electronics circuit from hot beverage heat and moisture; and
allowing the adhesive and the potting material to cure together until both are fully: cured.

32. The method of claim 31 in which the housing has at least one hole for receipt of injected potting material and including the step of closing the at least one hole after the potting material has been injected and before the potting material and adhesive have cured.

33. The method of claim 31 in which the step of holding together is performed with the use of adjustable, removable clamps.

34. The method of claim 31 including the step of terminating the step of holding together after the adhesive has set.

35. The method of 31 in which the step of terminating is performed by removing the clamps.

36. The method of claim 31 in which the adhesive is food-grade, urethane-based or epoxy-based adhesive.

37. The method of claim 31 including the step of filling in with potting material any voids or gaps in the adhesive to strengthen the bond between the mating surface.

38. The method of claim 31 in which
the potting material has a first coefficient of thermal expansion, and
the housing sections have second and third coefficients of thermal expansion that are substantially the same as the first coefficient of thermal expansion.

39. The method of claim 31 in which all of the adhesive, the potting material and housing sections have coefficients of thermal expansion that are all substantially the same.

* * * * *